(No Model.) 3 Sheets—Sheet 1.
H. JONES.
ELECTRIC LIGHT TOWER.
No. 510,479. Patented Dec. 12, 1893.
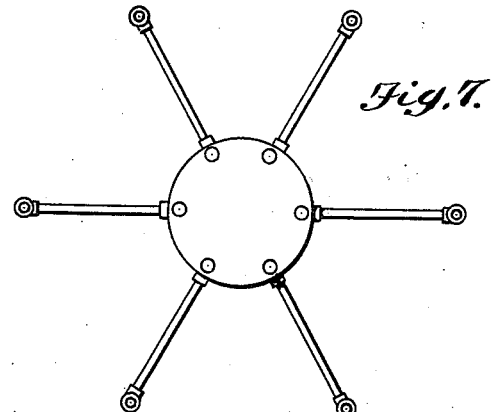
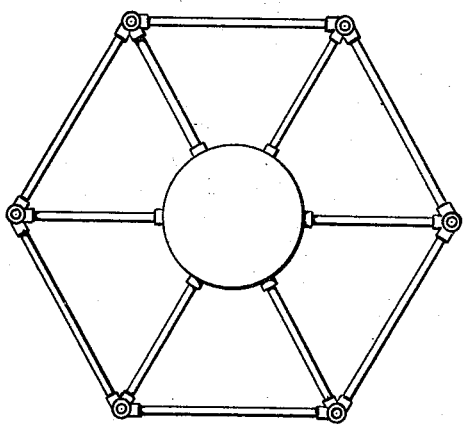
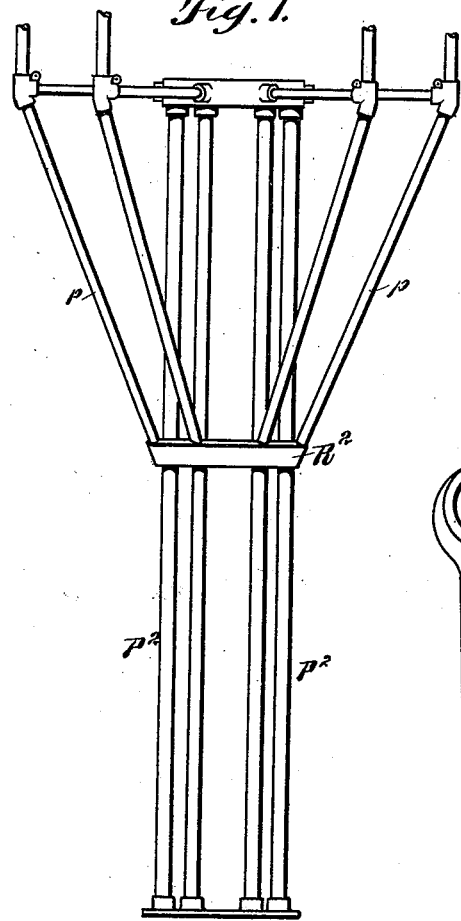
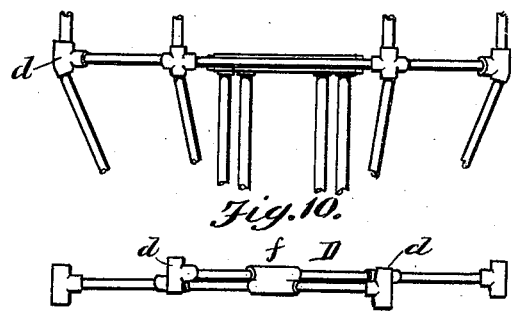
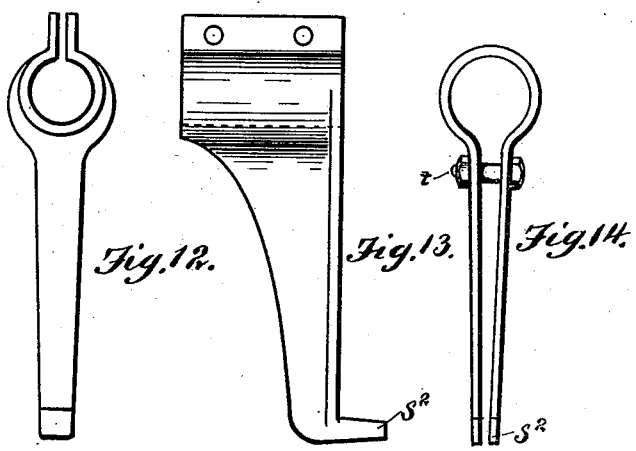
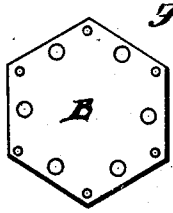
WITNESSES
D. W. Bradford
F. Clough
INVENTOR
Hiram Jones
by Parker & Burton
Attorneys.
THE NATIONAL LITHOGRAPHING COMPANY,
WASHINGTON, D. C.

(No Model.) 3 Sheets—Sheet 2.

H. JONES.
ELECTRIC LIGHT TOWER.

No. 510,479. Patented Dec. 12, 1893.

WITNESSES
D. W. Bradford
F. Clough

INVENTOR
Hiram Jones
by Parker & Burton
Attorneys.

(No Model.)  3 Sheets—Sheet 3.
H. JONES.
ELECTRIC LIGHT TOWER.
No. 510,479. Patented Dec. 12, 1893.
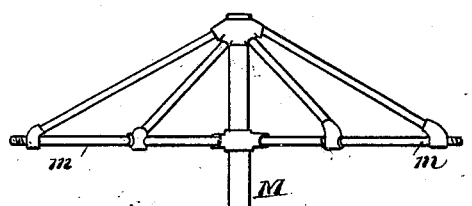
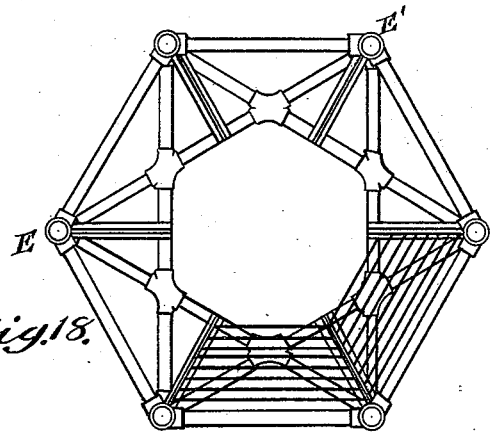
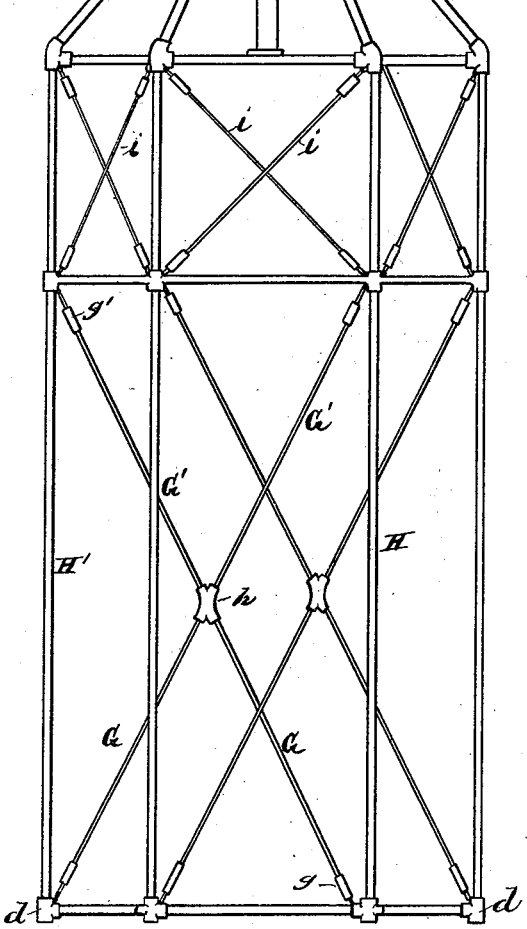
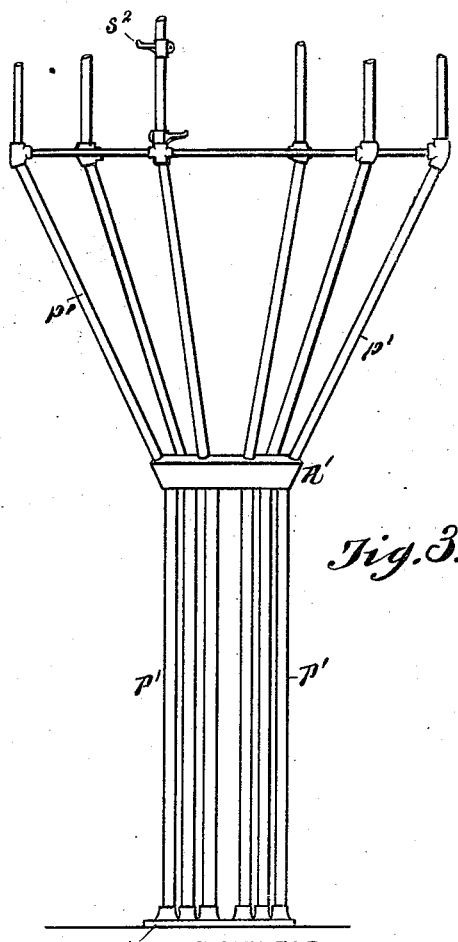
WITNESSES
INVENTOR
Hiram Jones
by Parker & Burton
Attorneys.
THE NATIONAL LITHOGRAPHING COMPANY,
WASHINGTON, D. C.

UNITED STATES PATENT OFFICE.

HIRAM JONES, OF DETROIT, MICHIGAN.

ELECTRIC-LIGHT TOWER.

SPECIFICATION forming part of Letters Patent No. 510,479, dated December 12, 1893.

Application filed March 10, 1893. Serial No. 465,388. (No model.)

*To all whom it may concern:*

Be it known that I, HIRAM JONES, a subject of the Queen of Great Britain, residing at Detroit, county of Wayne, State of Michigan, have invented a certain new and useful Improvement in Electric-Light Towers; and I declare the following to be a full, clear, and exact description of the invention, such as will enable others skilled in the art to which it pertains to make and use the same, reference being had to the accompanying drawings, which form a part of this specification.

This invention relates to electric light towers, and has for its object improvements in that class of towers which are constructed in the form of a prism supported by a standard or standards occupying much less space than does the main body of the tower. Prismatic towers have been erected at the summit of a single supporting pillar but such towers require special iron posts or pillars to be made for them, whereas I design to use for the pillar or support pipes of the same character as those that are used for the main standards or beams of the truss work that extends up into the air.

Figure 16:
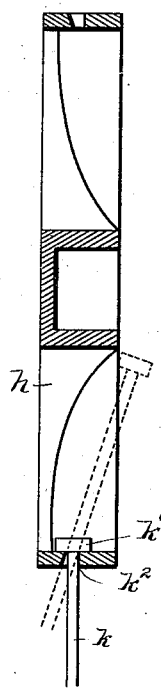
Figure 11:
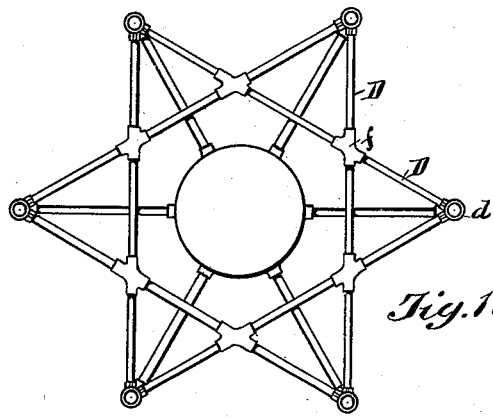
Figure 17:
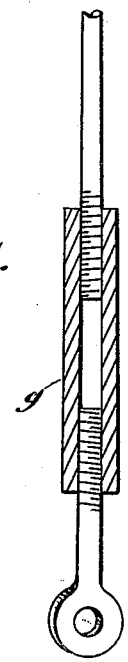
Figure 2:
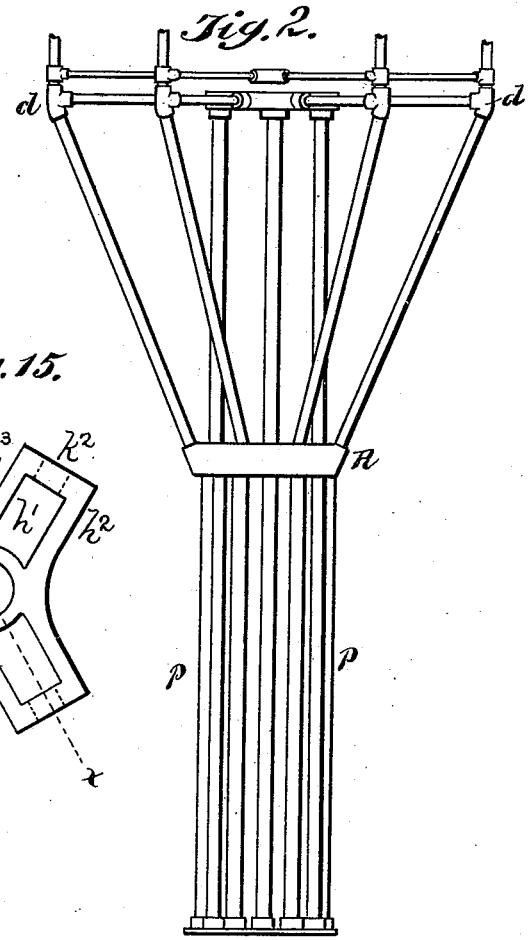
Figure 15:
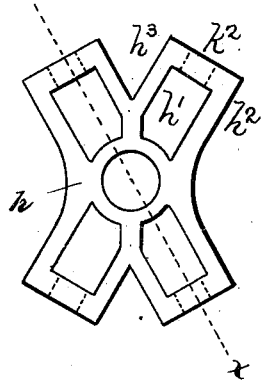
Figure 5:
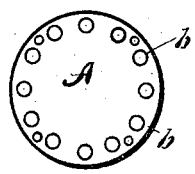

In the drawings, Figure 1, shows the lower panel or piller composed of six uprights and six braces. Fig. 2, shows a lower panel composed of six uprights that extend from the ground to the base of the prism, and six uprights that extend from the ground to the brace ring and six braces. Fig. 3, shows a base panel, composed of six uprights that rise from the ground to the brace ring, and six braces rising from the brace to the base ring to the base of the prism. Figs. 4, 5, and 6, are the plans of the base plates of Figs. 1, 2, and 3 respectively. Fig. 7, is a plan of the base of the prism adapted to rest on the base Fig. 1. Fig. 8, is an elevation of the top part of a base panel, similar to Fig. 1, except that it includes the horizontal girders shown in plan in Fig. 9. Fig. 9, shows a plan of the bracing at the top of the base panel. Fig. 10, shows in elevation the crossing joint of the horizontal girders shown in plan in Fig. 11. Fig. 11, shows in plan, the crossing joints of Fig. 10. Figs. 12, 13, and 14, show details of the ladder steps two of which are shown in elevation on Fig. 3. Figs. 15 and 16, are a plan and cross section of the junction iron by which the diagonal cross bracing is held together. Fig. 17, shows a turn buckle. Fig. 18, shows in plan the platform at the top of the tower, or just below the top of the tower. Fig. 19, is an elevation of the top panel of the prism showing the support for the lights.

For the lowermost panel I assemble the supports in the smallest compass possible consistent with the requisite strength. Below the surface of the ground I erect a suitable foundation of masonry, and to this foundation of masonry I bolt a plate A, B, or C. This plate may be circular, polygonal or in the form of a ring. It is provided on its upper side with a suitable number of sockets $b$, and these sockets are screw threaded within. Within the sockets are received the lower ends of a number of upright pipes P, P, P. The pipes extend upward. In the form shown in Fig. 1, six such pipes extend upward to the base of the prism passing through a ring $R^2$, from which rise six braces $p$, that extend obliquely upward and outward to the base of the prism. In the form shown in Fig. 2, twelve such pipes extend up to the ring R, where six of them terminate and six continue to the base of the prism. The outer corners of the prism are supported by six diagonal braces rising from the ring R. In the form shown in Fig. 3, six pipes rise from the base C, to the ring R', and above the ring R', are six oblique braces $p'$, supporting the corners of the tower. The prism itself I make with six uprights or corner posts, and brace them by connecting the alternate posts giving to the bracing the appearance of two equi-lateral triangles placed one upon the other as in Fig. 11.

The girders D, are formed with right and left screw threads, and they engage with couplings $d$, $d$, which serve also to couple the sections of the upright post together. At the points where the girders D, D, cross or intersect each one passes through a coupling iron $f$. The arrangement of horizontal girders, D, D, and the couplings $f$, are repeated at each section. I also employ oblique tie rods G, G, G', G', and these engage with the bottom ends of the uprights, are carried obliquely upward and engage with the top ends of alternate uprights as shown in Fig. 19, where the bottom of the upright H, is shown connected to the top of the upright H', and the bottom of the upright H', is shown connected with the top of the upright H.

Each diagonal tie G, G', is made in several pieces the entire tie rod G, G', combining the lower half G, and a turn buckle $g$, the upper half G', and the turn-buckle $g'$, and a joint iron $h$. The joint iron $h$, receives the inner headed ends of the four pieces G, G, G', G', which form the diagonal bracing.

The very topmost panel is not provided with the interior cross bracing just described, but only with a light lattice cross bracing $i, i$, which serves as a guard to protect a workman from falling, and the interior cross bracing is dispensed with to give the workman the largest amount of available room within the corner supports.

Fig. 18, shows the floor plan and from this it appears that the available room for standing purposes is about four times that which is available in the triangular prismatic tower, having the same distance between the corner posts as that from one corner post E, to the corner post E'. At the extreme summit is a mast M supporting mast arms $m$, to which the lights are hung. This form of construction provides an elevator way in the center of the tower.

To enable the workman to climb the tower in case the elevator is not used, or in case the elevator is out of order I provide a number of ladder steps which are secured to one of the upright corners. Such ladder steps are usually made of cast iron or cast iron made malleable and are formed with a step part, at one end of which is a guard, and at the other end is a hole through which it is slipped upon the upright when the upright is put in place, and it is located on the upright and held in place by a wedge driven into the hole between the iron and the upright. I make this step of a piece of sheet metal which I bend around the upright and clamp to the upright by bolts which pass through the two parts of the sheet metal but do not pass into the upright or in any wise cut or injure the upright. Fig. 12 shows such a step having its opening at the rear or opposite the step side. Fig. 14 shows such a step having its opening at the front extending entirely from the hole through which the post passes to the guard $s^2$. The bolt $t$, will clamp this very securely to the upright.

The junction iron $h$, shown in Figs. 15 and 16, is adapted to couple together four solid bolts or rods and is so shaped that it not only prevents the end movement or holds the bolts coupled together, but it also prevents the turning of the separate bolts or rods when strain is put upon them by the turn buckle. Each bolt $k$, is provided with a square bolt head $k'$, and the joint iron $h$, is provided with four sockets rectangular in cross section, that is, each socket $h'$, has two walls $h^2, h^3$, parallel to each other and sufficiently distant from each other to receive between them the square bolt head $k'$, but sufficiently close together to prevent the bolt head $k'$, from turning when it is in the socket $h'$. The hole $k^2$, through which the stem of the bolt projects increases in size from within outward as shown in Fig. 16, this shape permitting the bolt to be passed into the socket $h'$, through the hole $k^2$, and in order to pass the bolt to its place it must be inserted in an oblique manner, and pushed through the holes of the junction irons obliquely until the bolt head $k'$, passes into the socket $h'$ after which it may be turned to the position it is to occupy as a tension rod.

What I claim is—

1. In a prismatic tower, the combination of upright posts set in hexagon form combined with oblique tie rods uniting the alternate uprights, substantially as described.

2. In a prismatic tower the combination of a double triangular prism and a compound pillar supporting the prism formed of six uprights grouped in hexagonal form, substantially as shown.

3. In an electric light tower, the combination of a double triangular prism, horizontal girders uniting alternate upright members, substantially as described.

4. In an electric light tower, in combination with a supporting base, uprights arranged in hexagon form horizontal girders uniting alternate members of the uprights, and arranged in a pair of triangles placed one upon the other, substantially as described.

5. In an electric light tower, the combination of supporting pillars, uprights arranged in hexagonal form, horizontal girders uniting alternate members of the uprights, the said girders, being arranged in the form of two triangles placed one upon the other, and being united at their points of intersection by couplings, substantially as described.

6. In an electric light tower, the combination of uprights, arranged in hexagonal form, girders uniting alternate uprights, and a hexagonal staging provided with guard rails which unite adjacent uprights, substantially as described.

7. In combination with the square headed bolt, a junction iron provided with a rectangular socket $h'$ and a bolt hole $k^2$, increasing in size from within outward, substantially as and for the purpose specified.

In testimony whereof I sign this specification in the presence of two witnesses.

HIRAM JONES.

Witnesses:
M. A. REEVE,
EFFIE I. CROFT.